Jan. 16, 1962 G. A. GRUSS 3,017,184
PIN ELEVATING MECHANISM FOR BOWLING PIN SPOTTING MACHINES
Filed Dec. 6, 1957 7 Sheets-Sheet 3
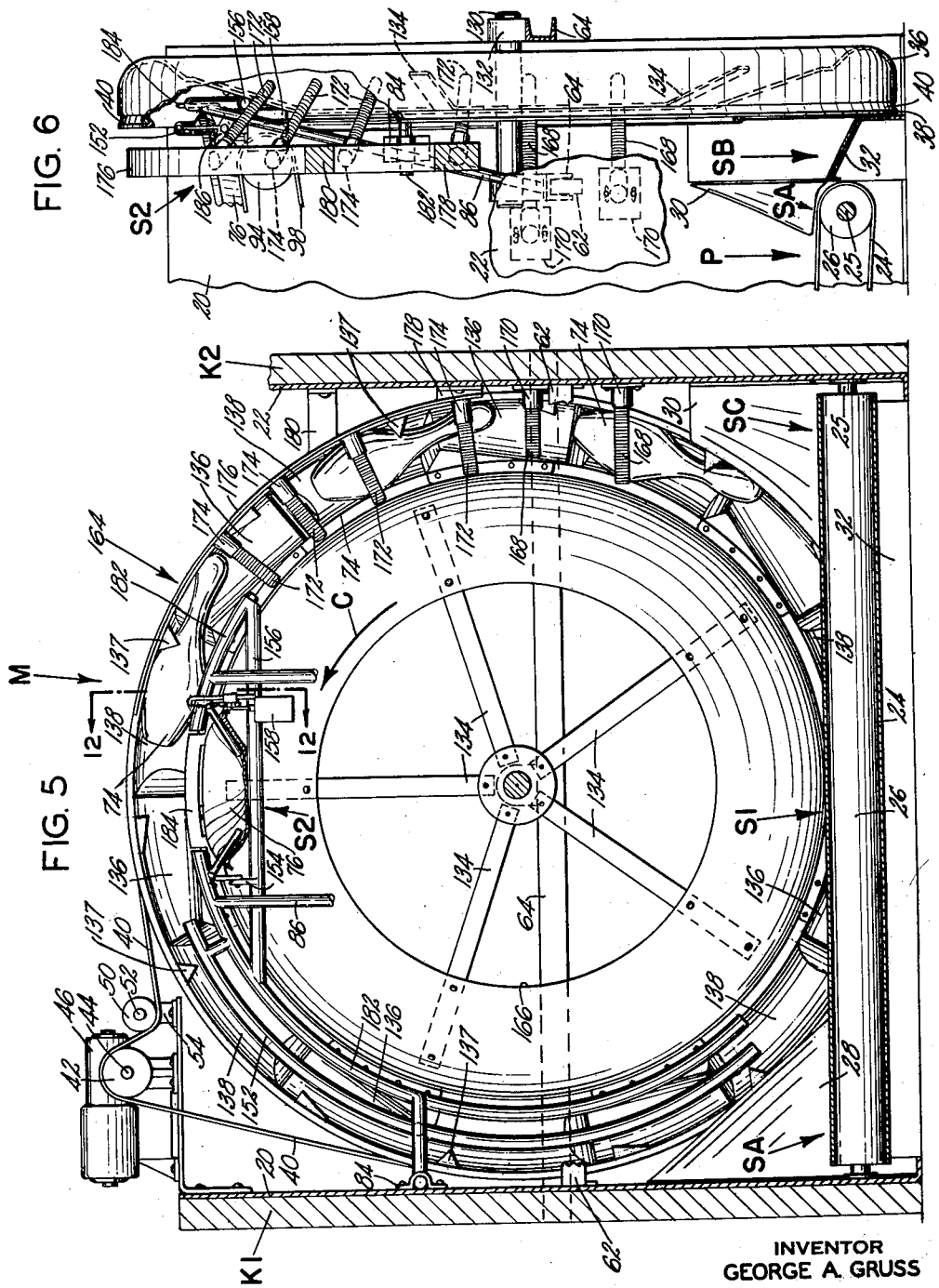
INVENTOR
GEORGE A. GRUSS
BY
ATTORNEY

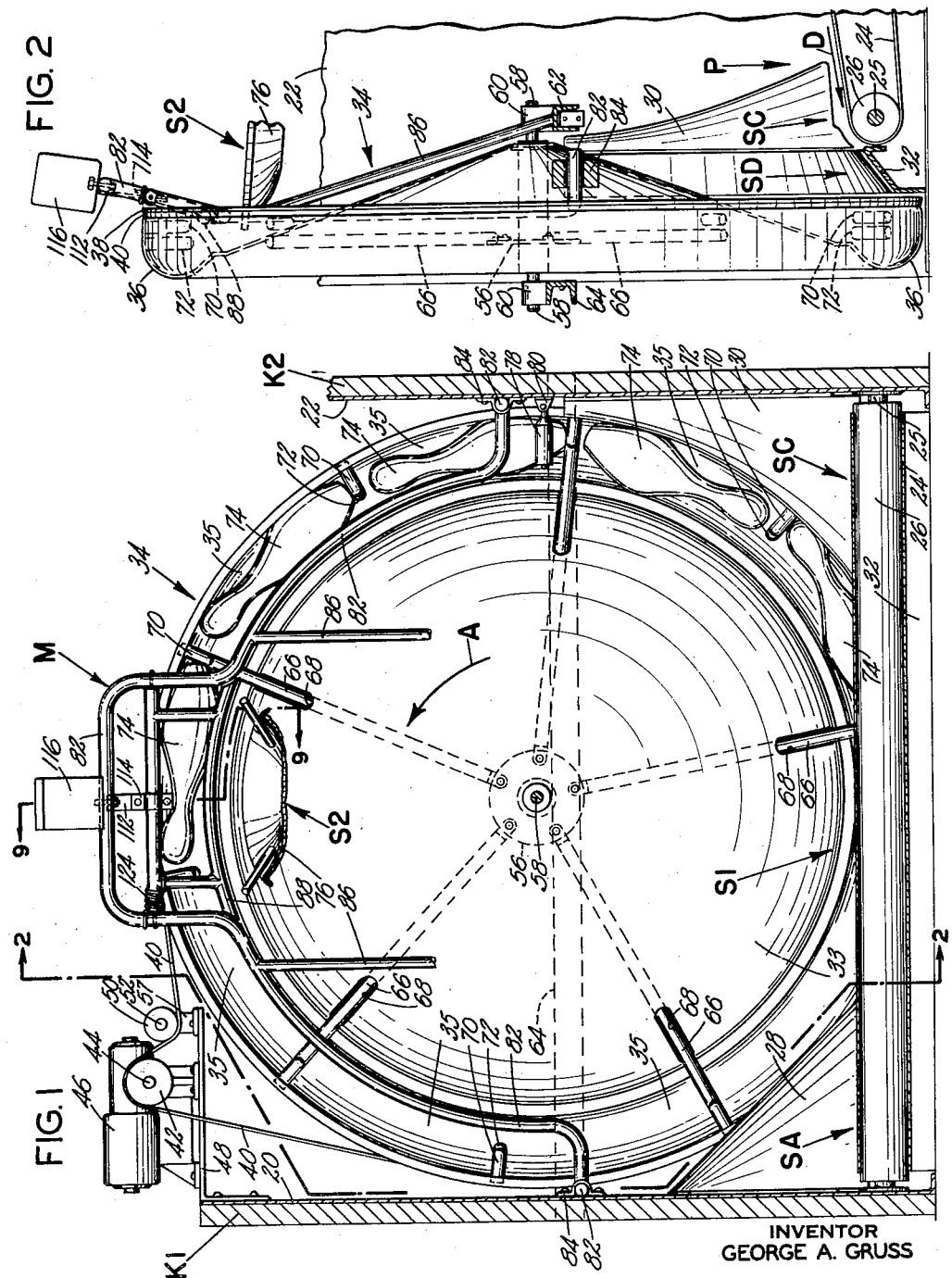

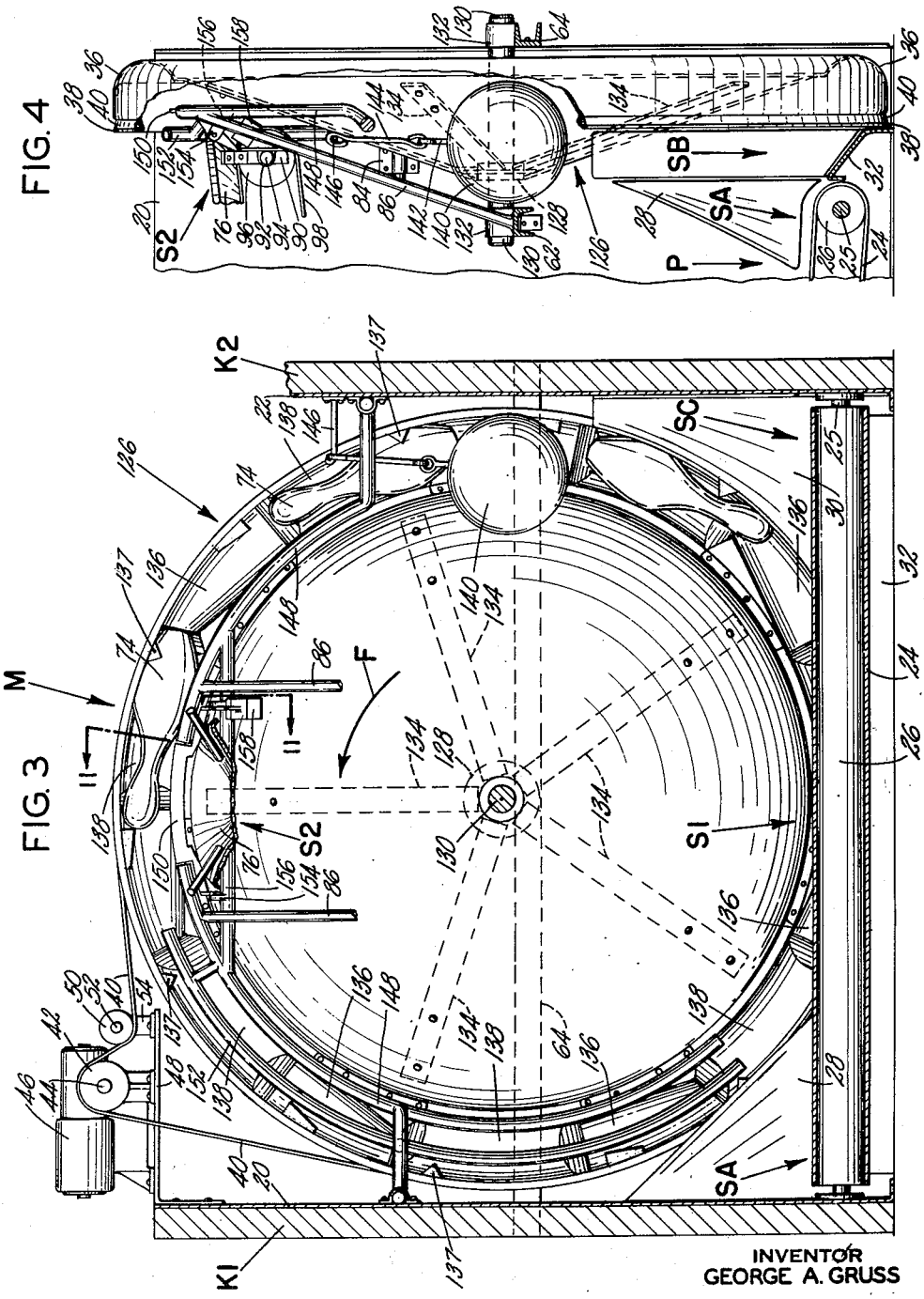

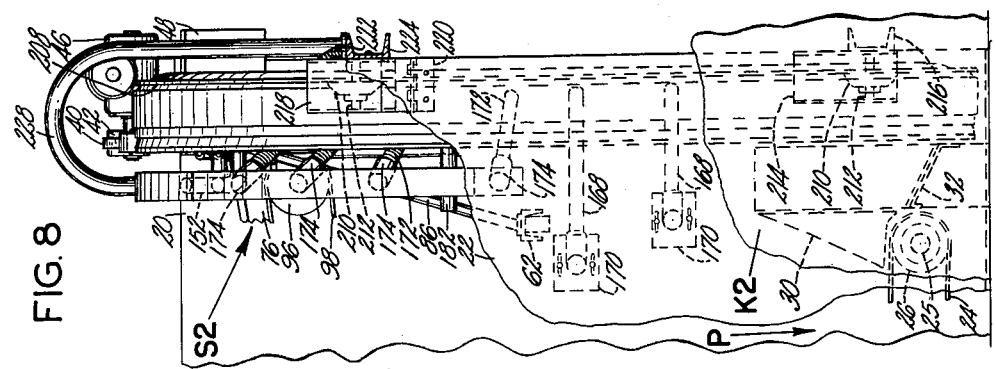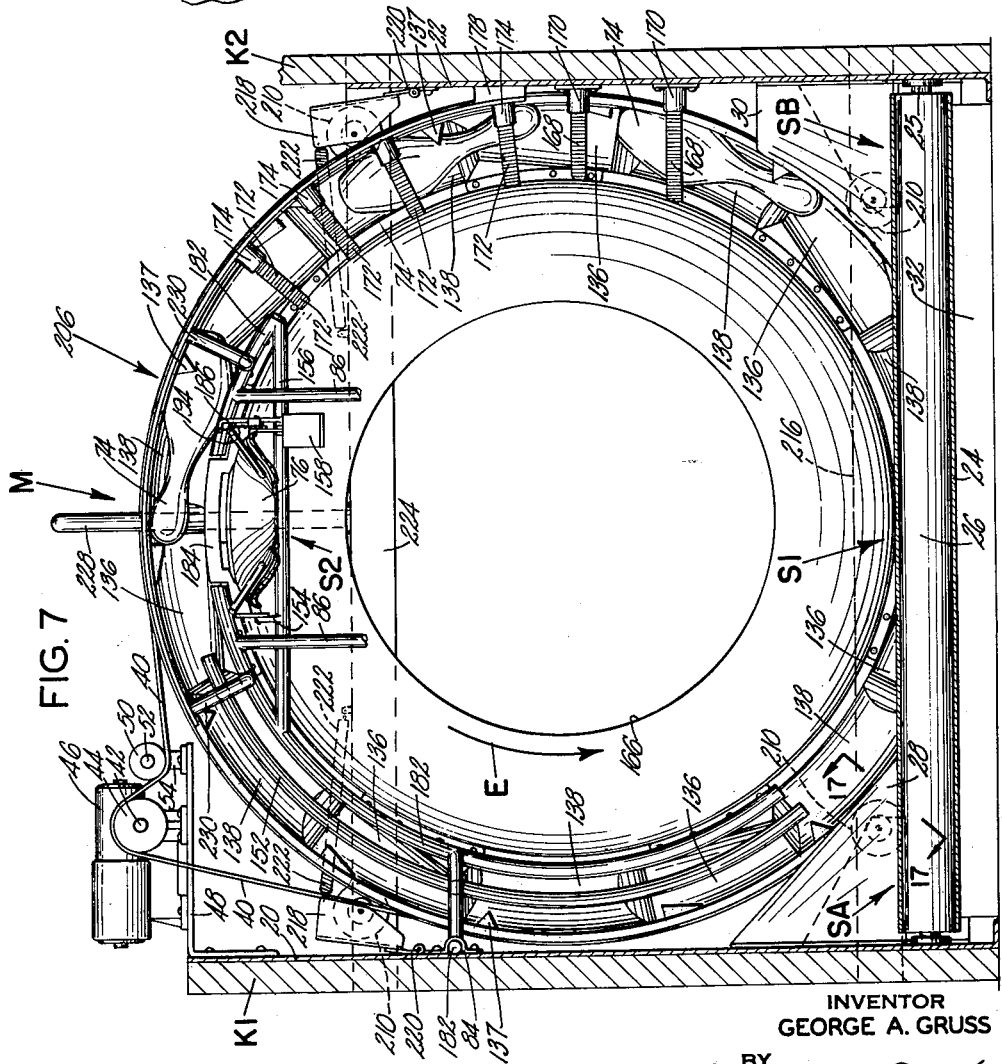

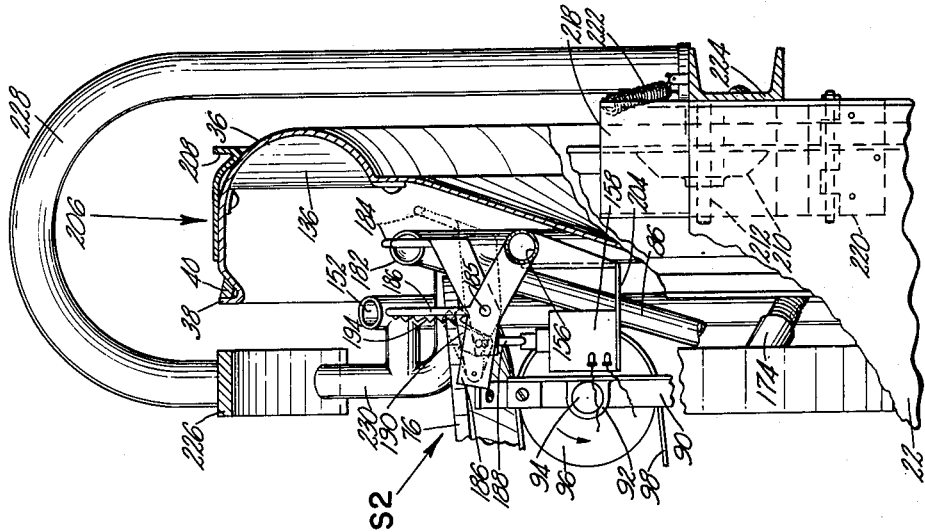

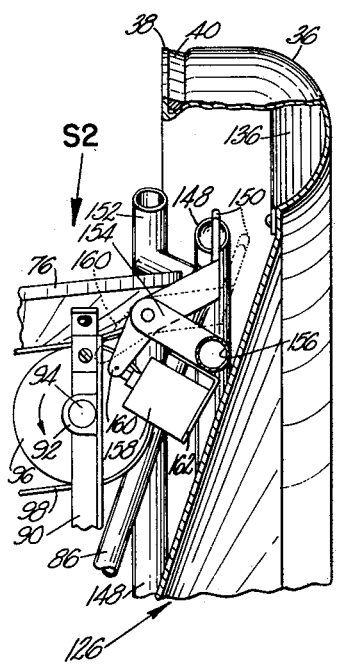
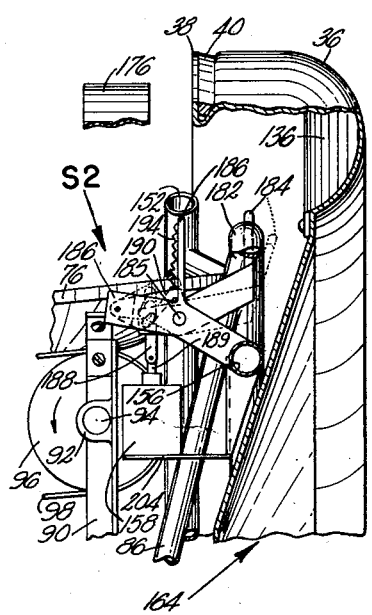
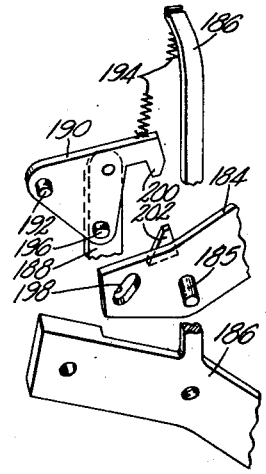
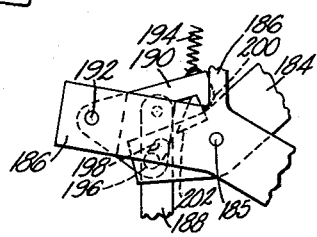
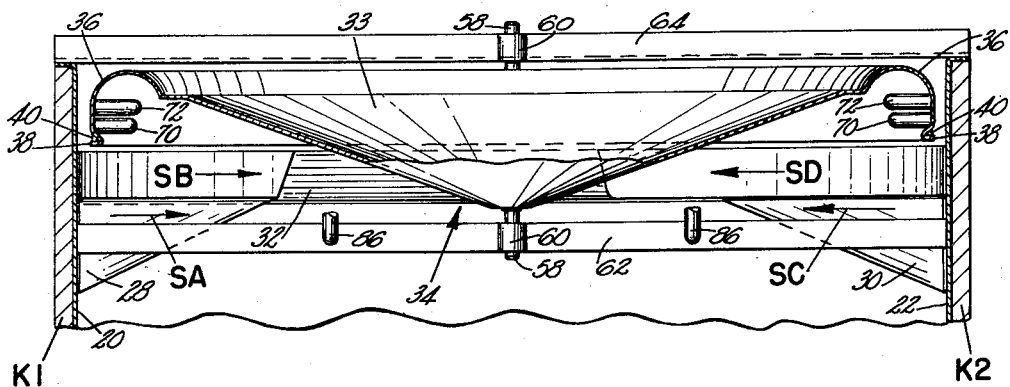

INVENTOR
GEORGE A. GRUSS
ATTORNEY

United States Patent Office 3,017,184
Patented Jan. 16, 1962

3,017,184
PIN ELEVATING MECHANISM FOR BOWLING PIN SPOTTING MACHINES
George A. Gruss, Shelby, Ohio, assignor to American Machine & Foundry Company, a corporation of New Jersey
Filed Dec. 6, 1957, Ser. No. 701,077
18 Claims. (Cl. 273—43)

This invention relates to bowling pin spotting machines and more particularly to novel mechanism for handling bowling pins and effecting their removal from the pit of a bowling alley to a point of discharge above the pit.

In bowling pin spotting machines and particularly automatic bowling pin spotting machines, it is desirable that bowling pins falling into the pit of a bowling alley be removed as quickly as possible therefrom and delivered to a pin spotting device which will spot them on a bowling alley in order that the play of a game can continue with as little interruption as possible.

In most devices provided heretofore for this purpose, considerable time has been consumed in delivering pins which have fallen into the pit to the pin spotting device. The purpose of the present invention is to effect the removal of pins from the pit of a bowling alley and deliver them in aligned arrangement to a pin distributor in a minimum of elapsed time.

The present invention is characterized by the provision of a novel rotary pin elevating member having a channel of generally U shape and provided with a plurality of pin carrying units; such as pockets located in the channel. Bowling pins delivered from the pit of a bowling alley onto the U-shaped channel of the rotary pin elevating member are retained in these pockets and delivered thereby to a discharge station.

It is therefore an object of the present invention to provide a novel pin elevating member which will reduce the elapsed time of delivery for pins from the pit of a bowling alley to the pin spotting unit of a bowling pin spotting machine.

It is a further object of the present invention to provide a pin elevating member whose novel construction permits the simultaneous movement of more pins from the pit of a bowling alley than has been heretofore possible in mechanisms of this general type.

An added object of the present invention is to provide novel pin carrying members to increase the efficiency of the pin elevating mechanism of a bowling pin spotting machine.

It is also an object of this invention to increase the number of pin carrying members by means of a novel construction whereby the separate means normally employed to retain pins in their associated pin carrying members is eliminated.

A further object of the invention is to provide means for storing pins until they are required by the pin setting mechanism of a bowling pin spotting machine.

It is an object of a modified form of this invention to provide a novel support system for the pin elevating member which permits ready access to the elevating member to facilitate pin changing while the elevating member is in motion or for necessary maintenance by a machine attendant from the rear of the machine.

With these and other objects not specifically mentioned in view, the invention consists in certain combinations and constructions which will be hereinafter fully described and then specifically set forth in the claims hereunto appended.

In the accompanying drawings which form a part of this specification and in which like characters of reference indicate the same or like parts:

FIGURE 1 is a front view illustrating a preferred embodiment of the invention.

FIGURE 2 is a partial side elevation taken on line 2—2 of FIGURE 1.

FIGURE 3 is a front view showing a modified form of the invention.

FIGURE 4 is a partial side elevation, parts broken away, of the structure shown in FIGURE 3.

FIGURE 5 is a front view illustrating another modified form of the invention.

FIGURE 6 is a partial side elevation taken on line 6—6 of FIGURE 5.

FIGURE 7 is a front view showing a third modified form of the invention.

FIGURE 8 is a partial side elevation taken on line 8—8, FIGURE 7.

FIGURE 9 is a detail view taken on line 9—9, FIGURE 1.

FIGURE 10 is a detail view taken on line 10—10, FIGURE 7.

FIGURE 11 is a detail view taken on line 11—11, FIGURE 3.

FIGURE 12 is a detail view taken on line 12—12, FIGURE 5.

FIGURE 13 is an exploded view of the gate operating linkage shown in FIGURE 12.

FIGURE 14 is a detail view of the gate operating linkage shown in FIGURE 13.

FIGURE 15 is a top sectional view taken on line 15—15, FIGURE 1.

Figure 16:
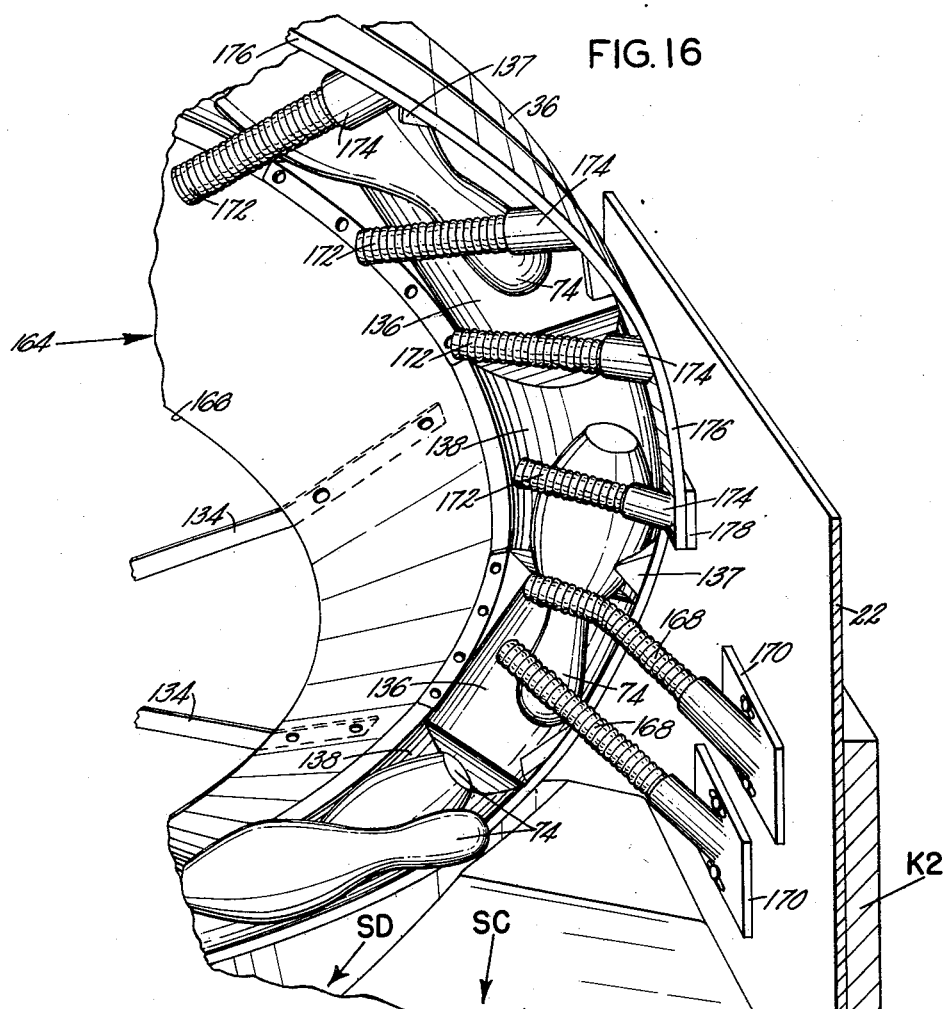
FIGURE 16 is a partial perspective view taken on line 16—16, FIGURE 6.
Figure 17:
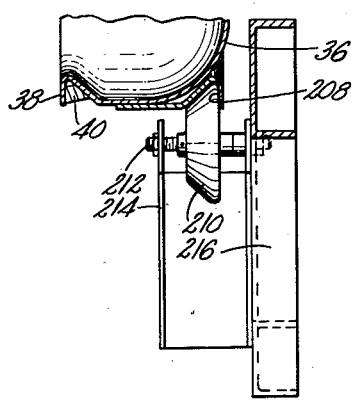
FIGURE 17 is a detail view taken on line 17—17, FIGURE 7.

Referring to FIGURES 1 and 2 which illustrate a preferred embodiment of the invention, the pin elevating mechanism designated generally M is supported between side plates 20 and 22 which are suitably secured to opposed inner faces of kickbacks K1 and K2 respectively of a conventional bowling alley. Bowling pins removed from the playing surface of the associated bowling alley either by a ball or by a suitable sweep mechanism (not shown) are deposited into the pit P of the alley and carried to the rear thereof on the upper substantially horizontal lap of conveyor or apron 24. Conveyor 24 travels around rollers 26 (only one shown) suitably secured to shafts 25 (only one shown) mounted in the opposed faces of side plates 20 and 22 transversely across pit P at the front and rear thereof. Shafts 25 are driven in any suitable manner (not shown) to travel conveyor 24 in the direction of arrow D in FIGURE 1.

Bowling pins on conveyor 24 are directed toward pick up station, designated generally S1, by directing members or plows 28 and 30, located at opposite sides of conveyor 24. Pins are thus directed over the top of transverse guide plate 32 on which they gravitate into pin elevating member 34. Rotary pin elevating member 34 preferably is formed of sheet metal parts, or sections, although it may be made of light castings or otherwise produced to perform its desired functions. The central or body portion 33 of member 34 is of substantially conical form with a generally U-shaped marginal rim or channel 36 (see FIGURE 15). The periphery of channel 36 is flanged to provide groove 38 which accommodates endless belt 40 to drive member 34 in the direction indicated by arrow A in FIGURE 1. The top surface of plate 32 is at approximately the same angle as the peripheral wall of channel 36 so that a pin can roll over plate 32 into channel 36 past flange 38. Pins are therefore delivered to and picked up by rotary member 34 without the use of mechanical adjuncts, thus reducing the structure to a minimum of parts and subjecting pins to little wear and agitation and their reception into elevating member 34 is achieved quickly and with a minimum of noise.

Belt 40 is driven by sheave 42 which is fixed to shaft 44 of motor 46. Motor 46 is secured to plate 48 which is mounted on side plate 20. Idler sheave 50 is rotatably supported on shaft 42 secured to bracket 54. Bracket 54 is slidably secured in elongated slots in plate 48 to provide an adjustment for positioning sheave 50 to keep proper tension on belt 40. Member 34 is fixed to hub 56 rotatably mounted on a substantially horizontal axial shaft 58 supported at each end in blocks 60. Block 60 adjacent the front portion of elevating member 34 is supported by cross frame member 62 secured to side plates 20 and 22. The other block 60 adjacent the rear portion of elevating member 34 is supported by cross frame member 64 which is secured to the rear flanges of side plates 20.

The pin elevating member 34 may be similar in construction and operation to that shown in Holloway et al. Patent 2,767,983 for Bowling Pin Elevating Mechanism. Further disclosure thereof, except as is necessary for an understanding of the present invention, is therefore omitted.

Elongated shafts 66, preferably of tubular construction, are equidistantly spaced radially about member 34 and secured adjacent one end respectively to the inner peripheral wall of channel 36 as shown in FIGURE 1. Shafts 66 pass through separate slots 68 in the conical section of member 34 and are secured at their other ends to hub 56, providing structural rigidity to member 34 and also serving as part of pin pocket 35 to be described hereinbelow. Studs 72 are likewise fixed at one end to the inner peripheral wall of channel 36 equidistantly between and aligned with shafts 66. Posts 70 are each secured at one end to the inner peripheral wall of channel 36 and co-act with each shaft 66 and stud 72 to form a pin pocket 35 as shown in FIGURES 1 and 2.

Ten pockets 35 have been found to operate satisfactorily and for the purpose of illustration are shown employed in FIGURE 1. However, if desired, the number of pockets provided could be increased or decreased depending upon firstly, the diameter of the pin elevating member 34 which is a function of the associated alley width and secondly, the type of pins handled; namely, ten pins, duck pins, candle pins or others. Shafts 66, studs 72 and post 70 would be re-distributed equidistantly about the channel 36 as described hereinabove with an increase or decrease thereof as the number of desired pockets of which they form a part is increased or decreased.

Plate 32 is fixed transversely in pit P to opposed faces of side plates 20 and 22. Plow 28 is secured to plate 32 and side plate 20 with surface SA of plow 28 extending inwardly and downwardly from side plate 20 to direct bowling pins moved rearwardly on conveyor 24 away from side plate 20 onto plate 32 (see FIGURES 1 and 15). Surface SB of plow 28 is curved upwardly from a point adjacent plate 32 conforming generally to the outer periphery of pin elevating member 34 to prevent pins from becoming lodged between plow 28 and pin elevating member 34. Plow 30 is secured to plate 32 and side plate 22 with surface SC of plow 30 extending inwardly and downwardly from side plate 22 to direct bowling pins moved rearwardly on conveyor 24 away from side plate 22 onto plate 32. Surfaces SD of plow 30 is curved upwardly from a point adjacent plate 32 conforming generally to the outer periphery of pin elevating member 34. Thus, any bowling pins not properly aligned or positioned, either butt end or handle end foremost, in the pin pockets of member 34 will slide down over surface SD onto plate 32 or conveyor 24 for re-delivery to station S1 for proper positioning in member 34.

Pin elevating member 34 is preferably driven continuously through pit P. Pins 74 delivered to station S1 and into channel 36 of member 34 as described hereinabove, are carried upwardly in the direction of arrow A in FIGURE 1. Pins 74 ride either butt end first or handle end first in pockets 35 of channel 36, formed by posts 70 and studs 72 or shafts 66, to pin discharge station S2. At station S2 pins 74 when released, as described hereinbelow, gravitate out of pockets 35 onto pin aligning and transfer mechanism 76 (partially shown) as the rotation of member 34 travels each pocket in succession therepast. Pin aligning and transfer mechanism 76 may be similar in construction and operation to that shown in Zuercher Patent 2,767,984 for Pin Distributing and Spotting Mechanism for Bowling Pin Spotting Machines and only so much as is required for a proper understanding of the present invention is included herein.

As indicated in FIGURES 1 and 2, pockets 35 are so constructed that they readily receive pins 74 lying lengthwise along and within channel 36 such that the axis of pins 74 lie in a plane generally transverse to the axis of rotation of member 34. Actually pins 74 cannot be supported for elevation in member 34 in any other position. Due to movement of member 34 and frictional engagement with conveyor 24, pins 74, at station S1 will be moved in various directions in attempting to seat themselves in pockets 35. Pins entering endwise into pockets 35 may be turned or moved into proper position therein or be thrown back upon conveyor 24, until they are properly delivered into a pin pocket 35.

Referring to FIGURE 1, pin discharge station S2 is shown substantially directly above station S1. If desired, station S2 may be located at some other position along the path of travel of channel 36 as long as space is provided for release of pins 74 from pockets 35 into the aligning and transfer mechanism 76.

Pin elevating member 34 is supported on shaft 58 midway between the opposed inner faces of side plates 20 and 22, member 34 being of such a diameter that it may rotate adjacent but clear of side plates 20 and 22 and the bottom of pit P.

Pins 74, riding in pockets 35, will contact roller 78 midway between station S1 and station S2. If not properly seated in pockets 35, pins 74 upon contact with roller 78, which is pivotally supported in bracket 80 secured to side plate 22, will be either properly seated therein or ejected. If ejected, pins 74 will slide or roll on surface SD of plow 30 back to station S1 to be properly positioned for elevation.

As pin elevating member 34 continues its upward rotation toward station S2, the force of gravity will attempt to shift a pin 74 out of seated position and cause it to fall out of its pocket 35. To prevent this, means is provided to hold pins 74 in seated arrangement in their respective pockets 35. Pins 74, properly seated in pockets 35 of channel 36 by roller 78, will immediately thereafter, upon further rotation of member 34, contact a guide 82, preferably of arcuate configuration, which retains pins 74 in pockets 35 against removal therefrom by the force of gravity as pins 74 are conducted toward station S2. Guide 82 is secured transversely above pit P to side plates 20 and 22 by clamps 84 and is supported by rods 86 which are, in turn, mounted on frame 62 as shown in FIGURES 1 and 2.

It is customary in the game of bowling that ten bowling pins be placed on the playing surface of a bowling alley in a predetermined, generally triangular, configuration. In order that a minimum of time be consumed in this operation, the present invention employs a total of twenty bowling pins with selectively operable pin release means for the pin elevating mechanism M. Thus, while some pins are being carried in pockets 35 of pin elevating member 34, a full complement of ten pins can be in readiness in the pin spotting units of the associated bowling pin spotting machine or actually be in the process of being spotted on the alley thereby. As the pin spotting units are emptied during the cyclic operation of the associated machine pins carried in pin elevating member 34 are released into the pin aligning and transfer mechanism 76 for delivery to the pin spotting units for the next successive spotting cycle of the bowling pin spotting machine of which the invention forms a part.

To accomplish this, gate 88 is positioned at station S2, as shown in FIGURES 1, 2 and 9, such that when gate 88 is held in a closed or substantially vertical position, pins 74 will be retained in their respective pockets 35 and be carried past station S2, thus utilizing pin elevating mechanism 34 for pin storage when the pin spotting units of the associated machine are carrying their full complement of ten pins.

Referring to FIGURE 9, pin aligning and transfer mechanism 76 comprises a generally U-shaped pan 95 located beneath channel 36 at station S2. Pins 74 released from pockets 35 as described hereinbelow are received into pan 95. Pan 95 is supported at each side from beneath on brackets 90 attached to suitable pivotally mounted framework (not shown). Bearings 92 are mounted on brackets 90 below pan 95, and support shaft 94 transversely beneath pan 95. Roller 96 is fixed to and rotates with shaft 94. Endless belt or conveyor 98 describes a path of travel around roller 96 and a second roller (not shown) remote from pan 95. It will be understood that pan 95 and the end of conveyor 98 adjacent thereto will thus be able to rotate in a substantially horizontal plane at station S2.

Conveyor or belt 98 is preferably provided adjacent its edges with guides 100 which operate to retain pins 74 thereon as they travel away from station S2. Shaft 94 is driven in any convenient manner to move pulley 96 in the direction indicated by arrow B in FIGURE 9. To insure that a pin delivered either handle end or butt end foremost by elevating member 34 will move only butt end foremost on belt 98, there are provided pin posts 102 mounted on and projecting inclinedly upward from each side of the top of pan 95 as shown in FIGURE 9. Posts 102 are so spaced and located with respect to the path of travel of pin elevating member 34 and the characteristics of a bowling pin are such that the handle of a pin released from pocket 35 either butt end or handle end foremost will engage one of the posts 102, pivoting thereabout to deliver the pin in butt end foremost position onto belt 98. Posts 102 are inclinedly mounted on pan 95 to provide sufficient clearance between posts 102 and rotary member 34 to permit the handle of a pin moving out of pocket 35 to pivot properly when post 102 is moved into an extreme rear position by the rotation of pan 95.

As each pin 74 is carried away from station S2 on belt 98, it contacts paddle 104, pivoting paddle 104 about shaft 105 of counter switch 106 supported on bracket 108. Each time paddle 104 is thus pivoted, counter switch 106 registers the passage of one pin 74. When a predetermined number of pins have registered on counter switch 106 to fill the requirements of the pin spotting units (not shown) of the associated machine, counter switch 106 breaks a circuit energizing solenoid 110. Solenoid 110 thus deenergized prevents gate 88 from opening as described hereinbelow causing subsequent pins 74 to be retained in pockets 35 of elevating member 34 until required by the pin spotting units after the next spotting cycle of the machine.

The lower portion of gate 88, when closed, forms a continuation of the lower section of guide 82 at station S2. The upper portion of gate 88 is pivotally mounted to the upper section of guide 82 at station S2 as shown in FIGURES 1, 2 and 9 and is biased by gravity toward its closed position in the lower section of guide 82. Stop 112 is secured to gate 88 by clamp 114. Box support 116 is secured to guide 82 and solenoid 110 is secured to support 116. Latch 118 is fixed to the external end of the armature of solenoid 110. When solenoid 110 is de-energized as described above, spring 120, attached at one end to support 116 and at the other end to pin 122 fixed in latch 118, maintains latch 118 in operative position preventing gate 88 from opening under the weight of pin 74 in pocket 35 bearing thereagainst as elevating mechanism 34 carries it therepast.

When, in the cyclic operation of the associated bowling pin spotting machine, the pin spotting units thereof again require pins, a suitable control system (not shown) re-establishes the circuit energizing solenoid 110. Solenoid 110, thus re-energized, overcomes the tension force in spring 120, retracting latch 118 clear of stop 112 to the position shown in dotted lines in FIGURE 9. With latch 118 in retracted position, gate 88 will again open in response to the urging of pins 74 in pockets 35 bearing thereagainst into the position shown in dotted lines in FIGURE 9, releasing these pins 74 into pan 95 of pin aligning and transfer mechanism 76. Pins 74, thus released into pan 95 and thence onto belt 98, will contact paddle 104 to actuate counter switch 106 as described hereinabove. When counter switch 106, after a predetermined number of actuations, breaks the circuit energizing solenoid 110, spring 120 returns latch 118 to operate position adjacent stop 112 to maintain gate 88 in closed position.

Should gate 88 and stop 112 be in the position indicated in dotted lines in FIGURE 9 when solenoid 110 is de-energized, gate 88 in returning to its closed position will cause stop 112 to contact the cammed surface 119 of stop 118. The gravity bias of gate 88 is such that stop 112 will overcome the force of spring 120, and raise latch 118 to its retracted position, allowing gate 88 to return to its closed position. Once stop 112 is no longer in contact with latch 118, spring 120 will return latch 118 to operative position against stop 112, preventing further pins from opening gate 88. Spring 124 as shown in FIG. 1, is fastened at one end to gate 88 and at the other end to guide 82 to insure the positive return of gate 88 to closed position. However the tension in spring 124 is sufficiently small to offer little resistance to a pin 74 as it urges gate 88 open as described in detail hereinabove.

FIGURES 3, 4, and 11 disclose a modified form of the invention in which pin pockets 35, posts 70, studs 72 and shafts 66 in the preferred embodiment have been eliminated and pin elevating member 34 and gate 88 have been modified. The pin handling and elevating mechanism as modified herein is operative in the same general manner as the preferred embodiment disclosed in FIGURES 1, 2, and 9. All like members are constructed and function in like manner.

Pin elevating member 126, shown in FIGURES 3 and 4, is installed in pit P of a bowling alley and driven as heretofore described for member 34 in the preferred embodiment. Pin elevating member 126 preferably is formed of sheet metal parts, or sections. However, if desired, it may be made of light castings, or otherwise produced to perform its intended functions. The central or body portion of member 126 is of substantially conical form having a generally U-shaped marginal rim or channel 36. The periphery of channel 36 is flanged to provide groove 38 in which belt 40 rides. The top surface of plate 32 is at approximately the same angle as the peripheral wall of channel 36 so a pin can roll over plate 32 into channel 36 past flange 38. Pins are thus delivered to and picked up by rotary member 126 in a manner similar to that of member 34 in the preferred embodiment.

Member 126 is fixed to hub 128 which is rotatably mounted on shaft 130 secured at each end in blocks 132 as shown in FIGURE 4. One block 132 is supported on cross frame member 62 and the other block 132 is supported on cross frame member 64. Ribs 134 are secured at one end, to conical body portion of member 126 and at the other end to hub 128, providing structural rigidity to member 126.

Fillers 136 and cleats 137 are secured to member 126, and are equidistantly spaced in channel 36 to provide suitably shaped pin pockets 138. Seven pockets 138 have been found to operate satisfactorily, and for the purpose of illustration, are shown employed in FIGURE 3. However, if desired the number of pockets could be increased or decreased depending first upon the diameter of pin elevating member 126 and secondly, the type of bowling pins, handled; namely ten pins, duck pins, candle pins or others.

Pins 74 delivered to station S1 on conveyor 24 become seated, as heretofore described in the preferred embodiment, in pockets 138 and are carried upwardly either butt end first or handle end first in the direction indicated by arrow F in FIGURE 3 from station S1 to station S2. Pins 74 thus delivered to station S2 and released will gravitate out of pockets 138 into a pin aligning and transfer mechanism 76 (partially shown) as the rotation of member 126 travels each pocket 138 past station S2.

As illustrated in FIGURES 3 and 4, pockets 138 are so constructed that they readily receive pins 74 lying lengthwise along and within channel 36 such that the axes of pins 74 lie in a plane generally transverse to the axis of rotation of member 126. Actually pins 74 cannot be supported for elevation in pockets 138 of member 126 in any other position.

Pins 74, riding in pockets 138 and engaged by cleats 137, will contact ball 140 midway between station S1 and S2. Ball 140 is secured by eye 142 to the lower end of link 144. Link 144 is supported at its upper end on substantially horizontal stud 146 secured to side plate 22, thus providing a swingable mount for ball 140 adjacent channel 36. Ball 140 is so shaped and positioned with respect to member 126 that pins 74, not properly seated in pockets 138, will upon contact with ball 140, be either properly seated therein or ejected. If ejected, pins 74 will slide or roll on surface SD of plow 30 back to station S1 to be properly positioned for elevation.

Pins 74, properly seated in pockets 138, upon further rotation of member 126, contact a fixed guide 148, preferably of arcuate configuration, which is suitably secured transversely above pit P to side plates 20 and 22 by clamps 84 and supported by rods 86. Guide 148 operates in the same manner as guide 82 in the preferred embodiment to maintain pins 74 in pockets 138 against removal therefrom by the force of gravity.

When, as explained hereinabove, it is necessary for pins 74 to be retained in elevating member 126, a selectively operable gate 150 is provided at station S2 which remains in closed position and aligned with guide 148 as shown in FIGURE 11. Thus pins 74 at station S2 will be retained in pockets 138 and carried past gate 150 to contact the next section of guide 148 as pins 74 are returned to station S1. An additional guide 152, shown in FIGURE 3, is secured to this second section of guide 148 to coact therewith keeping pins 74, moved past station S2, seated in pockets 138 against the force of gravity as pins 74 are returned to station S1.

Gate 150 is pivotally supported by brackets 154 which are in turn secured to cross member 156 of guide 148. The external end of the armature of solenoid 158 is pivotally attached to arm 160 which is an extension of one side of gate 150. Solenoid 158 is mounted on bracket 162 secured to bracket 154.

When, as explained hereinabove, it is necessary for gate 150 to remain in closed position, a circuit energizing solenoid 158 is completed. Solenoid 158 thus energized, retracts its armature moving arm 160 downwardly to bring gate 150 in line with guide 148 (see FIG. 11), causing pins 74 to be retained in pockets 138 and to pass station S2. When pins 74 are again to be released at station S2, as explained hereinabove, the circuit energizing solenoid 158 is broken. When solenoid 158 is thus de-energized, a spring within solenoid 158 extends the armature thereof, moving arm 160 and gate 150 to open position shown in dotted lines in FIGURE 11. When gate 150 is in open position, the distance between its top edge and fillers 136 is less than half the diameter of a bowling pin or approximately 2 inches. This causes a pin 74 in pocket 138 positioned above station S2 to gravitate or be urged out of pocket 138 into aligning and transfer mechanism 76. As in the preferred embodiment, when a sufficient number of pins has been released at station S2 as required by the pin spotting units (not shown) of the associated bowling pin spotting machine, the circuit energizing solenoid 158 is again established, causing gate 150 to be returned to its closed position, preventing additional pins 74 from being discharged from member 126.

FIGURES 5, 6, 12 and 16 diclose another modified form of the invention in which a section of guide rail 148 of the first modified form of the invention has been replaced by gripper fingers 172 and the center portion of elevating mechanism 126 has been removed. The pin handling and elevating mechanism as modified herein is operative in the same general manner as the preferred embodiment or first modified form disclosed in FIGURES 1, 2 and 9 and 3, 4 and 11 respectively. All like members are constructed and function in like manner.

Pin elevating mechanism 164, shown in FIGURES 5 and 6, is installed in the pit of a bowling alley and driven as heretofore described for members 34 and 126 in the preferred and modified form of the invention. The center body portion of member 164 is of substantially conical form having a generally U-shaped marginal rim or channel 36, groove 38, fillers 136, cleats 137, pockets 138 and ribs 134, all of which are similar in construction and operation as heretofore described in the preferred or first modified form of the present invention.

It is customary in bowling establishments to periodically remove used bowling pins from play and replace them with new or refinished pins. This is especially true with American Bowling Congress sanctioned "league" play which requires that only sets of approved pins be used. A minimum of elapsed time in making a complete change of bowling pins is desirable in order to obtain maximum efficiency in the operation of the bowling establishment. Heretofore in mechanisms of this general type, pin changing has been accomplished by removing one pin at a time as it is delivered to station S2 by reaching over the top of the elevating mechanism M and inserting new pins into the distributor mechanism of the associated machine. Opening 166, provided in conical body portion of member 164, permits pins swept into pit P of a bowling alley to be removed in mass at station S1 and new or refinished pins to be there inserted into the associated bowling pin spotting machines. Since, by employing this modified form of the invention, this operation can now be accomplished at pit level rather than by reaching over the top of the machine and a plurality of pins can be removed at one time from station S1 rather than singularly at station S2, the elapsed time required for pin changing is greatly reduced. In addition, opening 166 provides ready access to the elevating mechanism M and its associated apparatus for a machine attendant in performing any necessary maintenance or repair.

Pins 74 delivered to station S1 on conveyor 24 become seated in pockets 138 as heretofore described and are carried upwardly either butt end first or handle end first in the direction indicated by arrow C in FIGURE 5 from station S1 to station S2. Pins 74 thus delivered to station S2 and released will gravitate out of pockets 138 into pin aligning and transfer mechanism 76 (partially shown) as the rotation of member 164 travels each pocket 138 past station S2.

Spring fingers 168 are secured in brackets 170 which are, in turn, fixed to side plate 22. Spring fingers 172 are secured in collars 174 which are mounted to the inner peripheral wall of support 176, which is preferably of arcuate configuration. Support 176 is mounted on brackets 178 and 180 which are secured to side plate 22. Support 176 preferably conforms generally to the outer periphery of pin elevating member 164. Pins 74, riding in pockets 138 and engaged by cleats 137, contact springs 168 midway between station S1 and S2 as shown in FIGURE 16. Due to spacing of spring fingers 168 from member 164 and their flexibility, any improperly seated pin 74 which contacts springs 168 will either be properly seated in pocket 138 or be ejected therefrom to slide or roll on surface SD of plow 30 back to station S1 to be properly positioned for elevation.

Pins 74, properly seated in pockets 138, upon further rotation of member 164, contact spring fingers 172 which operate to retain pins 74 in pockets 138 against the force of gravity. As pins 74 approach station S2, they contact guide 182 which is secured transversely above pit P to side plate 20 by clamp 84 and supported by rods 86 which are suitably secured to retaining guide 182 and frame 62. Guide 182 then assumes the function performed by springs 172 of retaining pins 74 in pockets 138.

When, as explained hereinabove, it is necessary for pins 74 to be retained in elevating member 164, a selectively operable gate 184 is provided at station S2 which remains in closed position and aligned with guide 182 as shown in FIGURE 12. Thus pins 74 at station S2, will be retained in pockets 138 and carried past gate 184 to contact the next section of guide 182 as pins 74 are returned to station S1. An additional guide 152, shown in FIGURE 5, is secured to and co-acts with this second section of guide 182 to keep pins 74, moved past station S2, seated in pockets 138 against the force of gravity as they are returned to station S1.

Gate 184 is mounted on studs 185, pivotally supported at each side in brackets 186 and 154 which are, in turn, secured to cross member 156 of guide 182. When, as explained hereinabove, it is necessary for gate 184 to remain in closed position, a circuit is completed energizing solenoid 158. Solenoid 158, thus energized, retracts its armature 189, moving link 188, pivotally attached at one end to the external end of armature 189 and at its other end to latch 190, downwardly. Solenoid 158 is secured to bracket 204 mounted on cross member 156.

Referring to FIGURES 13 and 14, latch 190 is pivotally supported in bracket 186 by stud 192. When link 188 is pulled downward as solenoid 158 is energized, latch 190 is pivoted about stud 192 overcoming the tension in spring 194 which is attached at one end to latch 190 and at the other end to an arm extension of bracket 186. As latch 190 is thus pivoted, stud 196, secured to the lower end of latch 190 in elongated slot 198 in gate 184, reaches the bottom of slot 198 and upon further rotation of latch 190 causes a downward force to be transmitted to gate 184. This downward force pivots gate 184 about stud 185 bringing it to its closed position in guide 182. As gate 184 reaches its closed position, extension 200 of latch 190 engages key 202, secured to gate 184, and any forces tending to force gate 184 open are resisted by the locking action of key 202 and extension 200. This locking device, by resisting the forces tending to open gate 184, permits solenoid 158 to be of smaller capacity than would be necessary if solenoid 158 alone held gate 184 in closed position. When, as explained hereinabove, pins are again to be released at station S2, the circuit energizing solenoid 158 is broken. Solenoid 158, thus de-energized, allows spring 194 to raise link 188 and latch 190, moving extension 200 out of engagement with key 202. This permits pins 74 in pockets 138 which bear against gate 184 to pivot gate 184 into open position indicated by the dotted lines in FIGURE 12. When gate 184 is in open position, the distance between its top edge and fillers 136 is less than half the diameter of a bowling pin or approximately 2 inches. This causes a pin 74 in pocket 138 positioned above station S2 to fall or be urged out of pocket 138 into aligning and transfer mechanism 76. As in the preferred embodiment, when a sufficient number of pins have been released at station S2 as required by the pin spotting mechanism (not shown) of the associated bowling pin spotting machine, the circuit energizing solenoid 158, is again established, causing gate 184 to return to its closed position preventing further pins 74 from being discharged out of member 164.

A third modified form of the invention is disclosed in FIGURES 7, 8, 10 and 17. This modification employs a pin elevating member with pockets similar to the second modified form of the invention shown in FIGURE 5 except that the elevating member is supported at its periphery by four rollers rather than at its central axis. The pin handling and elevating mechanism as modified herein is operative in the same general manner as the preferred embodiment or the other modified forms of the invention heretofore described. All like members are constructed and function in like manner.

Pin elevating mechanism 206, shown in FIGURES 7 and 8, is installed in the pit of a bowling alley and driven as heretofore described for members 34, 126, and 164. The center body portion of member 206 is of substantially conical form having a generally U-shaped marginal rim or channel 36, groove 38, fillers 136, cleats 137 and pockets 138 all of which are similar in construction and mode of operation as heretofore described. Opening 166 is provided in member 206 to provide ready access for pin changing and machine maintenance, as explained hereinabove for member 164.

A grooved track 208 is fixed to the outer wall of channel 36, and completely encircles member 206 which is guided and supported by four rollers 210 tapered to fit grooved track 208. Rollers 210 are rotatably mounted on shafts 212 at spaced points adjacent the outer wall of channel 36. Lower shafts 212 rotatably mounting lower rollers 210, are secured to brackets 214 at each side of member 206. Brackets 214 are attached to frame member 216 which in turn is fixed transversely of pit P to side plates 20 and 22. Upper shafts 212 rotatably mounting upper rollers 210, are secured to brackets 218 at each side of member 206. Brackets 218 are pivotally suspended from side plates 20 and 22 by hinges 220. Springs 222 attached at one end to brackets 218 and at the other end to channel 224, secured transversely above pit P to side plates 20 and 22, operate to maintain upper rollers 210 under constant pressure in track 208.

Collars 174 are secured to support 226 attached at one end to bracket 178 and other end to post 228 attached to channel 224. Guide 182 is secured to support 226 by braces 230, ensuring rigidity to the entire structure.

It will be apparent that as belt 40 is driven by motor 46, member 206 will be rotated to move pockets 138 past station S1 to engage pins 74 delivered thereto on conveyor 24 and conduct them to station S2 for release to the pin aligning and transfer mechanism 76 as heretofore described. Member 206, supported at substantially the four quadrant points on its periphery on rollers 210 in track 208 will be free to rotate in a substantially vertical plane without the necessity of a central axle and supporting structure. It will be apparent that this arrangement permits easier access to elevating member 206 for pin changing and machine maintenance than heretofore possible since the central axle and its supporting structure have been replaced by the peripheral supports described above.

The invention above described may be varied in construction within the scope of the claims, for the particular embodiments selected to illustrate the invention are but a few of the possible forms which our invention may assume. The invention, therefore, is not to be

I claim:

1. In a bowling pin spotting machine for use with a bowling alley having a pit at one end thereof, mechanism for elevating pins from said pit to a point of delivery thereabove comprising a rotary member provided with an annular channel, means mounting said member in said pit for rotation about a substantially horizontal axis and to enable successive portions of said channel to pass into and out of said pit, means for rotating said member, means for moving pins from said pit into said channel as successive portions pass therethrough, stationary means mounted adjacent the pin receiving portions of said channel for holding said pins in said channel against removal therefrom during the rotation of said member in elevating said pins to said point of delivery and means co-acting with said pin holding means at said point of delivery to selectively release said pins from said channel.

2. In a bowling pin spotting machine for use with a bowling alley having a pit at one end thereof and kickbacks at opposite sides of said pit, mechanism for elevating pins from said pit to a point of delivery thereabove comprising a rotary member provided with an annular channel, means mounting said member in said pit for rotation about a substantially horizontal axis and to enable successive portions of said channel to pass into and out of said pit, means for rotating said member, means for moving pins from said pit into said channel as successive portions pass therethrough for elevation to a pin discharge station at said point of delivery, means mounted on said kickbacks adjacent the pin receiving portions of said channel for holding said pins in said channel against removal therefrom during the rotation of said channel and control means at said pin discharge station for the selective release of said pins from said channel.

3. In a bowling pin spotting machine for use with a bowling alley having a pit at one end thereof, mechanism for elevating pins from said pit to an elevated position thereabove comprising a rotary member having an annular channel extending about its axis of rotation, a plurality of spaced pin holding units in said channel, a pin receiving station located in said pit, a pin discharge station located in an elevated position above said pit, means for rotating said member to travel said units in succession to and from said pin receiving station and to and from said pin discharge station, means for directing pins into said units in said channel and stationary means mounted adjacent said units to retain pins therein during the movement of said pins in said units from said pit to said pin discharge station thereabove, a portion of said last-named means at said discharge station being operative to selectively release said pins from said units.

4. In a bowling pin spotting machine for use with a bowling alley having a pit at one end thereof and kickbacks at opposite sides of said pit, mechanism for elevating pins from said pit comprising a rotary member having an annular channel extending about its axis of rotation, a plurality of substantially equidistantly spaced pin holding units in said channel, a pin receiving station in said pit, a pin discharge station located above said pit, means for rotating said member to travel said units in succession to and from said pin receiving station and to and from said pin discharge station, means for directing pins into said units in said channel, means mounted on said kickbacks adjacent said units to retain pins therein during the movement of said pins in said units, a gate, means mounting said gate in said last-named means to form a continuation of said last-named means, and means for selectively operating said gate to release said pins from said units at said pin discharge station.

5. Pin holding mechanism for use with a rotary pin elevating device of an automatic bowling pin spotting machine adapted to elevate bowling pins from the pit of a bowling alley to a discharge station thereabove, said elevating device including a substantially U-shaped channel provided with a plurality of pin carrying units, said pin holding mechanism comprising stationary means mounted in spaced relation to the pin receiving portions of said pin carrying units of said pin elevating device to retain pins in said units against removal therefrom during the rotation of said pin elevating device and release means mounted in said last-named means to selectively release said pins from said channel for gravity movement from said units at said discharge station.

6. Pin holding mechanism for use with a rotary pin elevating device of an automatic bowling pin spotting machine adapted to elevate bowling pins from the pit of a bowling alley to a discharge station thereabove, said elevating device including a substantially U-shaped channel provided with a plurality of pin carrying units, said pin holding mechanism comprising an arcuate guide, means securing said guide in spaced relation adjacent the pin receiving portions of said pin carrying units of said pin elevating device, means on said guide to retain pins in said units during the movement of said pins from the pit of a bowling alley to said elevated pin discharge station, a gate, means mounting said gate at said discharge station to selectively release said pins from said channel for gravity movement from said units.

7. In a bowling pin spotting machine for use with a bowling alley having a pit at one end thereof and kickbacks at opposite sides of said pit apparatus for elevating pins from said pit comprising a rotatable pin elevating member, means supporting said member for rotation about a substantially horizontal axis, spaced pockets in said member, means for rotating said member to pass each of said pockets successively through said pit, means for moving pins in said pit into said pockets, a roller, a roller means, pivotally mounting said roller to one of said kickbacks adjacent the path of travel of pins in said pockets whereby said pins will be engaged by said roller and properly seated therein for elevation, an arcuate guide, means securing said guide to said kickbacks and adjacent said pin elevating member to hold said pins in said pockets against removal therefrom during the rotation of said member, a pin discharge station, a gate means pivotally mounting said gate in said guide at said discharge station and means for selectively securing said gate in said guide to prevent said pins in said pockets at said discharge station from operating said gate and be released therethrough.

8. The invention as defined in claim 7 wherein said last-named means includes an operating circuit, a counter switch connected in said circuit, a solenoid connected in said circuit, a latch connected to said solenoid mounted adjacent said gate whereby when a predetermined number of said pins released through said gate as registered on said counter switch, said solenoid is deenergized whereby said latch connected to said solenoid engages said gate preventing said pins from being released therethrough from said pockets.

9. In a bowling pin spotting machine for use with a bowling alley having a pit at one end thereof and kickbacks at opposite sides of said pit apparatus for elevating pins from said pit comprising a rotatable pin elevating member, means supporting said member for rotation about a substantially horizontal axis, spaced pockets in said member, a pin discharge station, means for rotating said member to pass each of said pockets successively through said pit and past said pin discharge station, means for moving pins in said pit into said pockets, a sphere, means swingably mounting said sphere to one of said kickbacks, adjacent the path of travel of pins in said pockets whereby said pins will be engaged by said sphere and properly seated therein for elevation, an arcuate guide, means securing said guide to said kickbacks and adjacent said pin elevating member to retain said pins in said pockets against removal therefrom during the rotation of said member, a gate, means mounting said gate in said guide at said discharge station and means for selectively securing said gate in said guide to prevent said pins in said pockets from being released therefrom by said gate at said discharge station.

10. The invention as defined in claim 9 wherein said last-named means includes an operating circuit, a counter switch connected in said circuit, a solenoid connected in said circuit and attached to said gate whereby when a predetermined number of said pins released by said gate has registered on said counter switch, said solenoid is energized whereby said gate is secured in said guide preventing said pins in said pockets from being released thereby at said discharge station.

11. In a bowling pin spotting machine for use with a bowling alley having a pit at one end thereof and kickbacks at opposite sides of said pit, apparatus for elevating pins from said pit comprising a rotatable pin elevating member, means supporting said member for rotation about a substantially horizontal axis, spaced pockets in said member, pin discharge station, means for rotating said member to pass each of said pockets successively through said pit and past said discharge station, means for moving pins in said pit into said pockets, a set of elongated coil springs, means mounting said springs to one of said kickbacks adjacent the path of travel of pins in said pockets whereby said pins will be engaged by said springs and properly seated therein for elevation, an arcuate guide, means securing said guide to said kickback mounting said springs, a second set of elongated coil springs, means mounting said second set of springs on said arcuate guide and adjacent said pin elevating member to retain said pins in said pockets against removal therefrom during the rotation of said member moving said pins toward said pin discharge station, a second arcuate guide, means mounting said arcuate guide to the other of said kickbacks and adjacent said pin elevating member to retain said pins in said pockets against removal therefrom during the rotation of said member, moving said pins away from said pin discharge station, a gate, means pivotally connecting said gate to said second arcuate guide at said discharge station and means for selectively securing said gate in said guide to prevent said pins in said pockets from being released therefrom by said gate at said discharge station.

12. The invention as defined in claim 11 wherein said pin elevating member is provided with a central aperture for ready access thereto, and said means supporting said member for rotation includes a track in the outer periphery of said member and a plurality of rollers rotatably mounted at spaced points in said track supporting said member in a substantially vertical plane.

13. The invention as defined in claim 2 wherein said last-named means includes an operating circuit, a counter switch connected in said circuit, a solenoid connected in said circuit, a latch, means pivotally connecting said latch to said solenoid and adjacent said gate such that, when a predetermined number of said pins released by said gate have registered on said counter switch, said solenoid is energized whereby said latch pivotally connected to said solenoid is moved into engagement with said gate preventing said pins from gravitating therethrough from said pockets.

14. In a bowling pin spotting machine for use with a bowling alley having a pit at one end thereof, mechanism for elevating pins from said pit comprising a rotary member having an annular channel of substantially U-shape extending about its axis of rotation, a plurality of spaced pin pockets in said channel, a pin receiving station in said pit, a pin discharge station located above said pit, means for rotating said member to travel said pockets in succession to and from said pin receiving station to and from said pin discharge station, means for directing pins into said pockets, stationary means mounted in spaced relation to said pin pockets to retain pins in said pockets against removal therefrom during the rotation of said members and release means mounted in said last-named means and adjacent said discharge station to selectively discharge said pins from said pockets at said discharge station.

15. In a bowling pin spotting machine for use with a bowling alley having a pit at one end thereof, mechanism for elevating pins from said pit comprising a rotary member having an annular channel of substantially U-shape extending about its axis of rotation, a plurality of spaced pin pockets in said channel, a pin receiving station in said pit, a pin discharge station located above said pit, means for rotating said member to travel said pockets in succession to and from said pin receiving station to and from said pin discharge station, means for directing pins into said pockets, arcuate guide, means securing said guide in spaced relation adjacent the path of travel of said pin pockets, means on said guide to retain pins in said pockets during the movement of said pins from the pit of a bowling alley to said pin discharge station, said last-named means including a gate, means mounting said gate at said discharge station, and means for selectively moving said gate out of its pin retaining position to selectively release said pins for gravity movement from said pockets.

16. In a bowling pin spotting machine for use with a bowling alley having a pit at one end thereof and kickbacks at opposite sides of said pit, mechanism for elevating pins from said pit comprising a substantially U-shaped rotatable channel, means mounting said channel in said pit for rotation about a substantially horizontal axis and to enable successive portions thereof to pass into and out of said pit, means for rotating said channel, means for moving pins from said pit into said channel as successive portions pass therethrough for elevation to a pin discharge station located above said pit, stationary means mounted in spaced relation to the pin carrying portions of said channel to retain pins in said channel against removal therefrom during the rotation of said channel, said last-named means including release means operative to selectively discharge said pins from said channel at said discharge station, and means for selectively operating said release means.

17. In a bowling pin spotting machine for use with a bowling alley having a pit at one end thereof and kickbacks at opposite sides of said pit, mechanism for elevating pins from said pit comprising a substantially U-shaped rotatable annular channel, means mounting said channel in said pit for rotation about a substantially horizontal axis and to enable successive portions thereof to pass into and out of said pit, means for rotating said channel, means for moving pins from said pit into said channel as successive portions pass therethrough for elevation to a pin discharge station located above said pit, an arcuate guide, means securing said guide in spaced relation adjacent the pin carrying portions of said channel, means on said guide to retain pins in said channel during the movement of said pins from the pit of a bowling alley to said elevated pin discharge station, a gate, means mounting said gate at said discharge station to selectively release said pins for gravity movement from said channel, and operating means for moving said gate to its pin release position.

18. In a bowling pin spotting machine for use with a bowling alley having a pit at one end thereof, apparatus for elevating pins from said pit comprising a substantially pit wide rotary member having a substantially U-shaped channel extending about its axis of rotation, said member provided with a central aperture for ready access to said channel, a plurality of pin pockets in said channel, a pin receiving station, a pin discharge station, means for rotating said member to travel said pockets in succession to and from said pin receiving station and to and from said pin discharge station, means for directing pins into said pockets, an arcuate guide, means securing said guide in spaced relation adjacent the path of travel of said pockets of said channel, means on said guide to retain pins in said pockets during the movement of said pins from the pit of a bowling alley to an elevated pin discharge station, a gate normally coacting with said guide to retain pins in said pockets of said channel, means mounting said gate at said discharge station to selectively release said pins from said pockets, and actuating means for moving said gate to its pin release position.

References Cited in the file of this patent

UNITED STATES PATENTS

| | | | |
|---|---|---|---|
| 1,190,645 | Hedenskoog | July 11, | 1916 |
| 1,468,212 | Redfield | Sept. 12, | 1923 |
| 2,015,428 | Hedenskoog | Sept. 24, | 1935 |
| 2,676,016 | Whipple et al. | Apr. 20, | 1954 |
| 2,686,053 | Phillips | Aug. 10, | 1954 |
| 2,697,604 | Blair | Dec. 21, | 1954 |
| 2,729,449 | Montooth | Jan. 3, | 1956 |
| 2,767,983 | Holloway et al. | Oct. 23, | 1956 |
| 2,932,513 | Patterson | Apr. 12, | 1960 |